(12) United States Patent
Yoshino et al.

(10) Patent No.: US 8,596,394 B2
(45) Date of Patent: Dec. 3, 2013

(54) BRAKE STRUCTURE FOR WHEEL ROTATING DEVICE

(75) Inventors: Tsutomu Yoshino, Saitama (JP); Koichi Oku, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 224 days.

(21) Appl. No.: 13/076,818

(22) Filed: Mar. 31, 2011

(65) Prior Publication Data

US 2011/0175431 A1  Jul. 21, 2011

Related U.S. Application Data

(62) Division of application No. 11/896,081, filed on Aug. 29, 2007, now Pat. No. 7,938,211.

(30) Foreign Application Priority Data

Aug. 29, 2006 (JP) ................................. 2006-231500

(51) Int. Cl.
 *F16D 51/00* (2006.01)
 *B60K 7/00* (2006.01)

(52) U.S. Cl.
 USPC ....................................... 180/65.51; 188/328

(58) Field of Classification Search
 USPC ................. 180/65.51, 65.6, 65.7; 188/74–76, 188/325–341
 See application file for complete search history.

(56) References Cited

U.S. PATENT DOCUMENTS

| 2,161,278 | A | * | 6/1939 | Bowen | 188/106 A |
|---|---|---|---|---|---|
| 2,867,296 | A | * | 1/1959 | Requenes | 188/76 |
| 4,330,045 | A | | 5/1982 | Myers | |
| 5,087,229 | A | | 2/1992 | Hewko et al. | |
| 5,382,854 | A | | 1/1995 | Kawamoto et al. | |
| 6,135,248 | A | | 10/2000 | Johnson et al. | |
| 6,768,932 | B2 | | 7/2004 | Claypole et al. | |
| 7,445,067 | B2 | | 11/2008 | Marsh et al. | |
| 7,527,113 | B2 | | 5/2009 | Jenkins | |
| 2003/0132584 | A1 | * | 7/2003 | Borroni-Bird et al. | 280/5.5 |
| 2007/0247001 | A1 | | 10/2007 | Nakano | |

FOREIGN PATENT DOCUMENTS

| DE | 100 61 221 A1 | 6/2002 |
|---|---|---|
| EP | 1 359 032 A2 | 11/2003 |
| JP | 2000-310264 | 11/2000 |
| JP | 2004-114858 A | 4/2004 |
| JP | 2005-75006 | 3/2005 |
| JP | 2005-104222 | 4/2005 |
| JP | 2005-335566 | 12/2005 |
| JP | 2006-57732 | 3/2006 |

* cited by examiner

*Primary Examiner* — John R Olszewski

(74) *Attorney, Agent, or Firm* — Birch, Stewart, Kolasch & Birch, LLP

(57) ABSTRACT

A brake structure for a wheel rotating device includes a motor provided in a wheel and is driven for rotating the wheel, and a braking mechanism for actuating brake to brake the wheel. The motor includes: a motor housing; a stator positioned in and fixed to the motor housing; and a rotor positioned in the motor housing and facing to the stator. The braking mechanism includes: a brake rotor to rotate with the wheel; frictional members to be in contact with the brake rotor for generation of braking force; a pressing force generating unit for generating pressing force of the frictional members so that the frictional members are urged to and pressed against the brake rotor by supplying brake fluid through a brake fluid passage to transmit fluid pressure; and a housing for the pressing force generating unit. The brake fluid passage is formed inside a wall of the motor housing, and is connected to a brake fluid supply port provided in the housing for the pressing force generating unit.

9 Claims, 15 Drawing Sheets

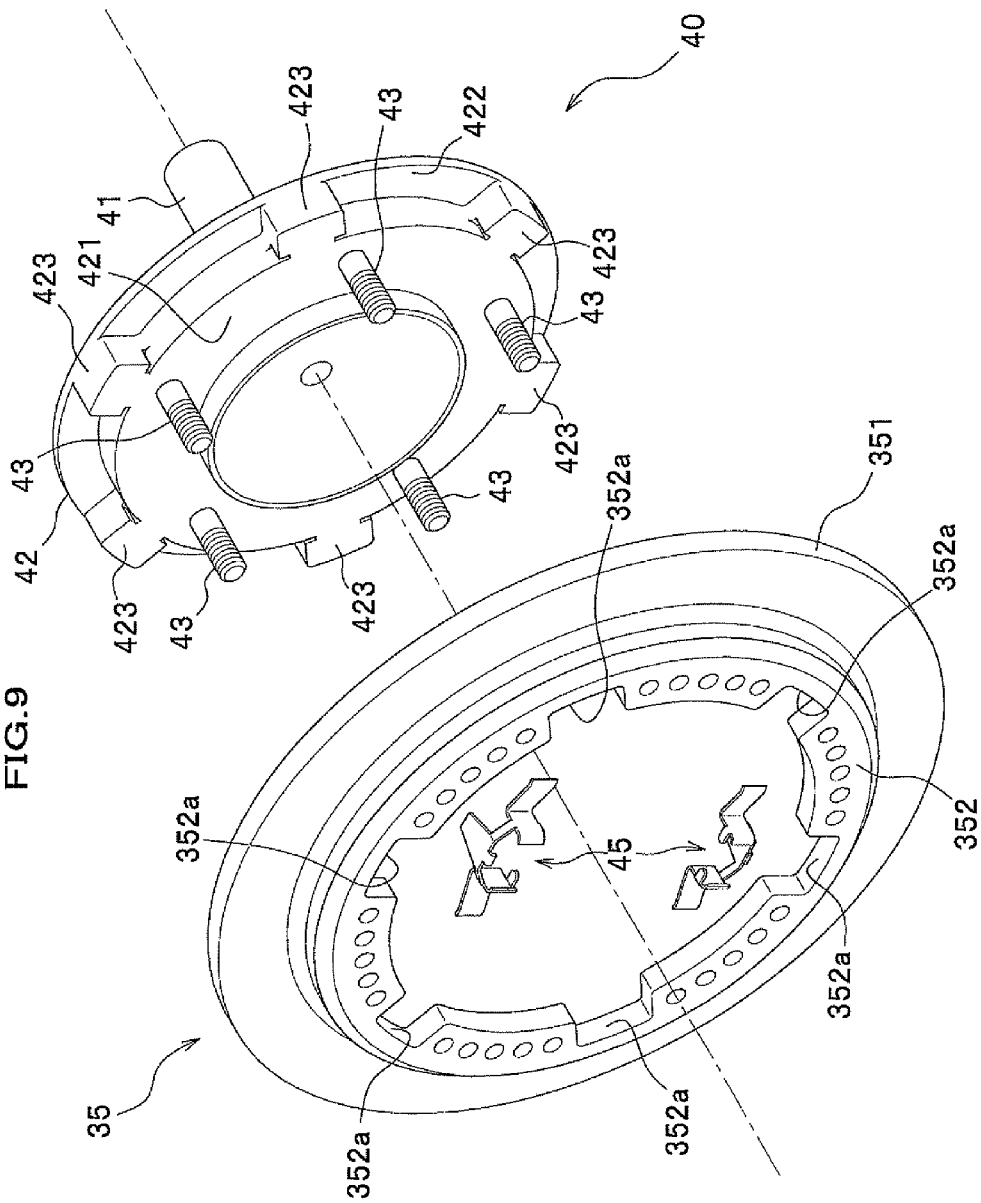

BRAKE STRUCTURE FOR WHEEL ROTATING DEVICE

CROSS REFERENCE TO RELATED APPLICATIONS

This application is a Divisional of U.S. application Ser. No. 11/896,081, filed on Aug. 29, 2007 now U.S. Pat. No. 7,938,211, and for which priority is claimed under 35 U.S.C. §120, which claims the foreign priority benefit under Title 35, United States Code, §119(a)-(d) of Japanese Patent Application No. 2006-231500 filed on Aug. 29, 2006 in the Japan Patent Office. The disclosure of all of the above-identified applications are herein incorporated by reference in their entirety.

BACKGROUND OF THE INVENTION

The present invention relates to a wheel rotating device for rotating a wheel of an automobile, and more particularly to a brake structure for a wheel rotating device which can reduce the size of the structure.

In-wheel motor for driving a wheel of an automobile is arranged in a limited space of the wheel. In recent years, attempts have been made to design layout of various parts so that the size of the whole device can be reduced while increasing the diameter of the motor for improving motor torque. For example, Japanese Laid-open Patent Application No. 2004-114858 discloses such a layout design. As a brake structure for the wheel rotating device, hydraulic brake is generally used so that a large braking force is obtained.

Japanese Laid-open Patent Application No. 2004-114858 discloses an in-wheel motor equipped with a hydraulic braking mechanism. According to this arrangement, an externally attached hydraulic pressure tube consisting of a brake hose is connected between a hydraulic pressure supply source to be fixed to the vehicle body and a braking device of a wheel. This brake hose is arranged so as to extend along the periphery of a motor housing.

However, since the brake hose extends along the motor housing and is attached externally, it is necessary to ensure mounting space for externally attached parts at the outer peripheral side of the motor. This makes it difficult to increase the diameter of the motor, and as a result, torque of the motor cannot be increased. Further, it is difficult to layout the brake hose.

In view of the above, the present invention seeks to provide a brake structure for a wheel rotating device which can eliminate the drawbacks as above, and which can reduce the size of the braking mechanism including a fluid passage (i.e., brake fluid passage) for brake application.

SUMMARY OF THE INVENTION

According to the present invention, there is provided a brake structure for a wheel rotating device, which comprises a motor provided in a wheel and is driven for rotating the wheel, and a braking mechanism for actuating brake to brake the wheel. The motor comprises a motor housing, a stator positioned in and fixed to the motor housing, and a rotor positioned in the motor housing and facing to the stator. The braking mechanism comprises a brake rotor to rotate with the wheel, frictional members to be in contact with the brake rotor for generation of braking force, a pressing force generating unit for generating pressing force of the frictional members so that the frictional members are urged to and pressed against the brake rotor by supplying brake fluid through a brake fluid passage to transmit fluid pressure, and a housing for the pressing force generating unit. The brake fluid passage is formed inside a wall of the motor housing, and is connected to a brake fluid supply port provided in the housing for the pressing force generating unit.

With this configuration of the brake structure, brake fluid is supplied from the brake fluid passage via the brake fluid supply port and into the housing, to thereby generate pressing force at the pressing force generating unit. This makes it possible to press the frictional members against the brake rotor to brake the wheel.

Since the brake fluid passage is formed inside the wall of the motor housing so that an externally attached hydraulic pressure tube such as a conventional brake hose is not required, there is no need to ensure space for mounting the externally attached parts, which results in a possibility that the diameter of the motor can be increased. Further, it is not necessary to consider the layout of the brake hose, and the number of constituent parts can be decreased.

In the aforementioned brake structure, the brake rotor is a disk rotor, and the frictional members are a first frictional member and a second frictional member positioned opposite to each other with the disk rotor interposed therebetween. Further, the first frictional member is fixed to the motor housing and the second frictional member is fixed to the pressing force generating unit, and the pressing force generating unit is accommodated in the housing and is movable in a direction of a rotation axis of the disk rotor. Furthermore, the housing is attached to the motor housing such as to be non-contacting with the outer periphery of the disk rotor.

With this configuration of the brake structure, the first frictional member is fixed to the motor housing. Therefore, it is not necessary to provide a dedicated mounting member on the housing, which can reduce the size of the braking mechanism in the direction of the rotation axis of the disk rotor. Namely, if the first frictional member is provided in a housing as with the conventional brake structure, the housing to which the first frictional member has been fixed is further attached to the motor housing, thereby increasing the thickness of the brake structure. On the contrary, the above brake structure is configured such that only the second frictional member is attached to the housing. This makes it possible to reduce the size of the brake structure in the axial direction. Further, a caliper half that is a half member of the conventional caliper can be used for the housing, thereby reducing the cost.

In the aforementioned brake structure, the brake fluid passage may be a linear passage formed inside the wall of the motor housing.

With this configuration of the brake structure, since the brake fluid passage is a linear passage, it is possible to form the brake fluid passage in a simple manner, thereby reducing the cost.

The aforementioned brake structure may further comprise a fixing member for fixing one of the frictional members. In the brake structure, the brake rotor is a disk rotor, and the frictional members are a first frictional member and a second frictional member positioned opposite to each other sandwiching the disk rotor therebetween. The first frictional member is fixed to the pressing force generating unit, the pressing force generating unit is accommodated in the housing and is movable in a direction of a rotation axis of the disk rotor, and the housing is formed integrally with the motor housing. Further, the second frictional member is fixed to the fixing member, and the fixing member is attached to the motor housing such as to be non-contacting with the outer periphery of the disk rotor.

With this configuration of the brake structure, since the pressing force generating unit is accommodated in the housing which is formed integrally with the motor housing having a sufficient strength, the motor housing can directly receive a reaction force of the pressing force generating unit. It is also possible to provide a bracket (fixing member) for fixing the frictional member that is positioned in the opposite side of the pressing force generation side in a simple structure. Further, the disk rotor can be formed in a flat and simple form, thereby reducing the cost.

In the aforementioned brake structure, the disk rotor may be a floating disk which is movable in a direction of a rotation axis of the disk rotor.

With this configuration of the brake structure, since the disk rotor is a floating disk which is movable in the rotation axis direction of the disk rotor, it is possible to apply a braking force equally on the opposite frictional member as well as to reduce dragging of the frictional members against the disk rotor while the brake is not being applied. Further, movement of the disk rotor in the axial direction allows the frictional surfaces of the disk rotor to be ensured without deformation of the disk rotor, thereby reducing a deviation of friction.

The aforementioned brake structure may further comprise a wheel rotating member for transmitting motor toque to the wheel, and a resilient member provided between the wheel rotating member and the floating disk and urging the floating disk in a direction away from the wheel rotating member so as to prevent the wheel rotating member and the floating disk from being proximate to each other.

With this configuration of the brake structure, the resilient member functions such as to urge the floating disk away from the wheel rotating member if the distance between the wheel rotating member and the floating disk is too narrow. This makes it possible to prevent interference between the floating disk and other parts such as the motor housing even if the frictional member is worn out and the thickness thereof becomes thinner. The wheel rotation unit includes, for example, an axle shaft and a hub.

In the aforementioned brake structure, the brake rotor may be a drum rotor. Further, the frictional members are a pair of frictional members, and each of the frictional members has one end which is pivotally supported and the other end which is attached to the pressing force generating unit. The pressing force generating unit is accommodated in the housing such as to reciprocate the frictional members in a direction slidably contacting with the inner periphery of the drum rotor, and the housing is attached to the motor housing.

With this configuration of the brake structure, there is provided a drum rotor type brake with a self-servo characteristic which causes less dragging and ensures extended area of the pads, and the housing is directly attached to the motor housing. This makes it possible to reduce the size of the brake structure in the direction of the rotation axis of the drum rotor.

According to the present invention, it is possible to reduce the size of the braking mechanism including the fluid passage (i.e., brake fluid passage) for brake application. Therefore, the diameter of the motor can be extended to increase the motor torque.

Other features and advantages of the present invention will be apparent from the following description taken in conjunction with the accompanying drawings.

BRIEF DESCRIPTION OF THE DRAWINGS

Other objects and aspects of the present invention will become more apparent by describing in detail illustrative, non-limiting embodiments thereof with reference to the accompanying drawings, in which:

FIG. 9 is an exploded perspective view showing the disk rotor and the axle shaft;

DETAILED DESCRIPTION OF THE INVENTION

Figure 1:
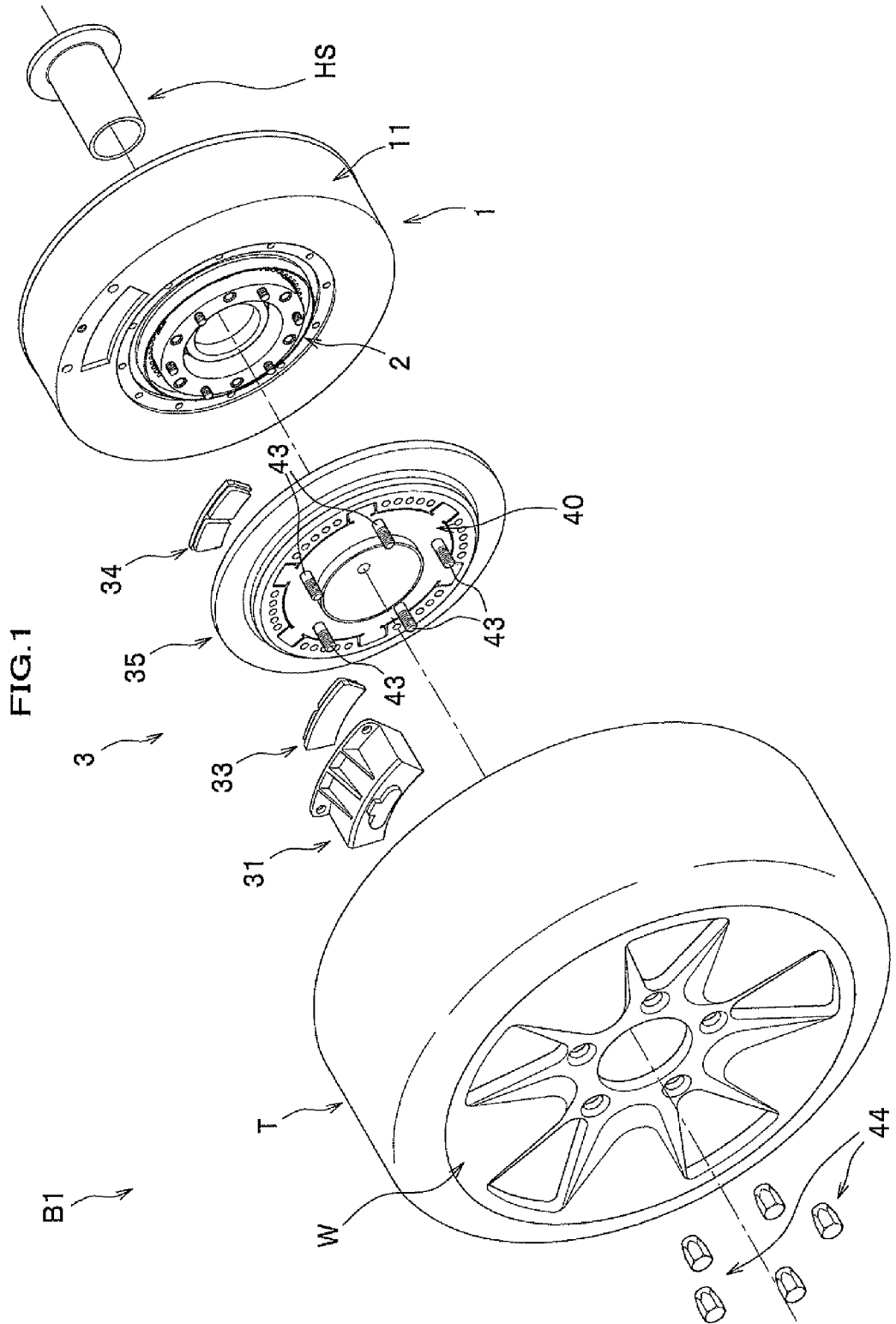
FIG. 1 is an exploded perspective view illustrating the internal structure of a wheel of an in-wheel motor vehicle according to a first embodiment.

Preferred embodiments of the present invention will be described with reference to the accompanying drawings. Like reference characters designate corresponding parts in the drawings, and detailed description thereof will be omitted.

First Embodiment

A brake structure for a wheel rotating device according to a first embodiment will be described below. In this preferred embodiment, explanation will be given on the case in which a brake structure according to the present invention is adapted to a disk brake. The brake structure for the wheel rotating device can be adapted to any of the wheels including front right, front left, rear right, and rear left wheels. In this preferred embodiment, the brake structure will be explained as an example where it is adapted to the front left wheel.

As shown in FIG. 1, the brake structure for the wheel rotating device (hereinafter referred to as the brake structure B1) is provided inside the wheel W and equipped with a motor (in-wheel motor) 1 for generating a rotation force for rotating the wheel W, reduction gears 2 (see FIG. 2) for increasing the motor torque while reducing the rotation speed of the motor 1 and then transmitting the rotation force to the wheel W, and a braking mechanism 3 for braking the wheel W.

Figure 2:
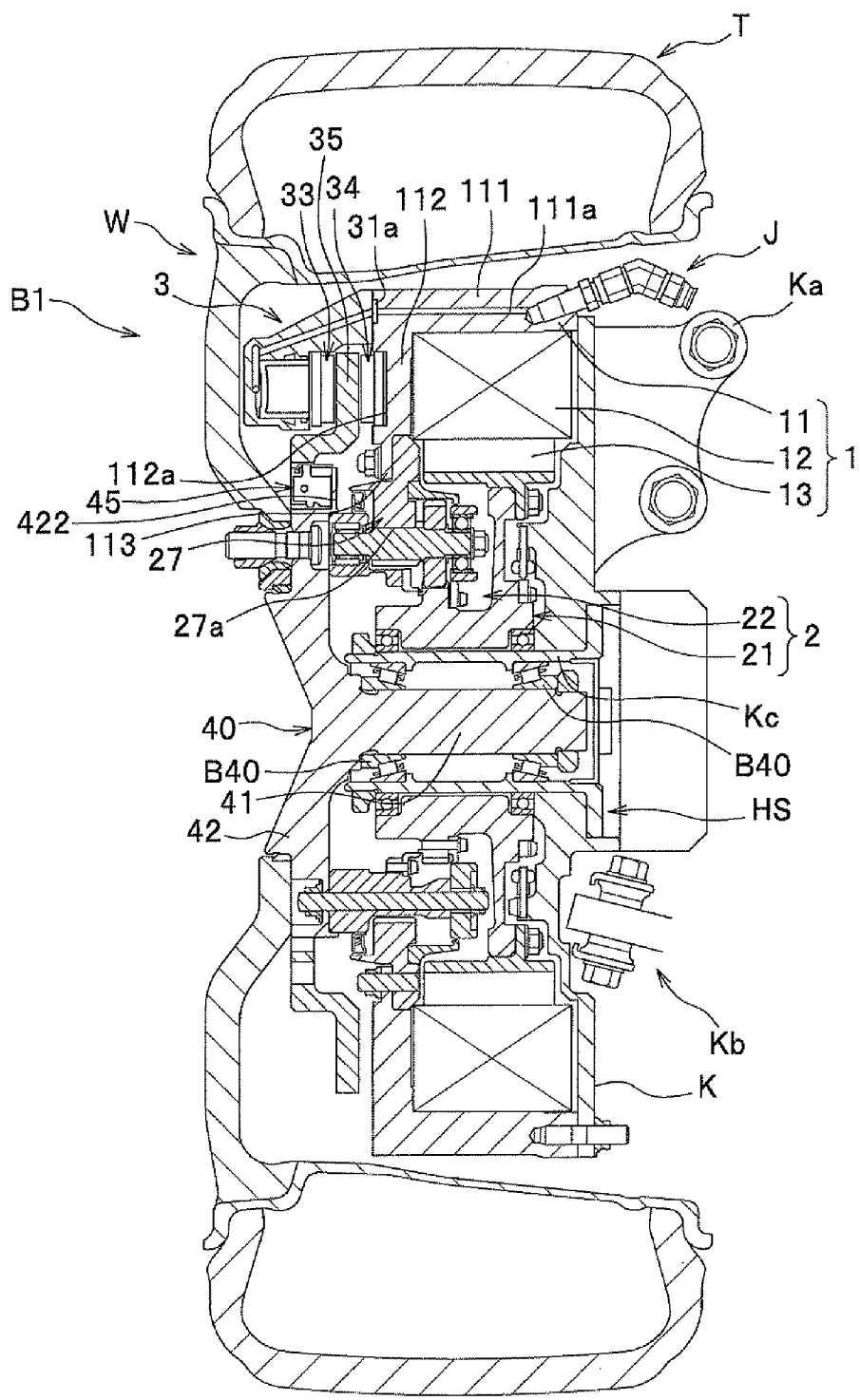
FIG. 2 is a vertical section showing the overall configuration of a brake structure for the wheel rotating device according to the first embodiment as viewed from the rear side of the vehicle body.

In FIG. 2, the right side is directed to the interior of the vehicle body, and the left side is directed to the exterior of the vehicle body. In the following descriptions, directions such as right and left are defined on the basis of the state as shown in FIG. 2.

Configuration of Wheel and Vehicle Body Side

As seen in FIG. 2, a tire T is mounted on the rim of the wheel W, and an axle shaft 40 as the rotation axis of the wheel W is joined by bolts 43 and nuts 44 (see FIG. 1). Meanwhile, a hub holder HS as a bearing member is joined to a knuckle K that is fixed to the vehicle body. The axle shaft 40 is rotatably inserted into the hub holder HS via bearings B40, B40, so that the rotation force generated by the motor 1 is transmitted via the reduction gears 2 and the axle shaft 40 and into the wheel W.

The knuckle K has a substantially disk-shaped configuration. The knuckle K is provided with a joint portion Ka at an upper right surface for connecting the suspension and with a fixing portion Kb at a lower right surface for fixing the lower arm. Provided at the center portion of the knuckle K is a center hole Kc for fitting therein the hub holder HS. See FIG. 3. The motor housing 11 for the motor 1 is attached to the knuckle K.

Configuration of Motor

Figure 3:
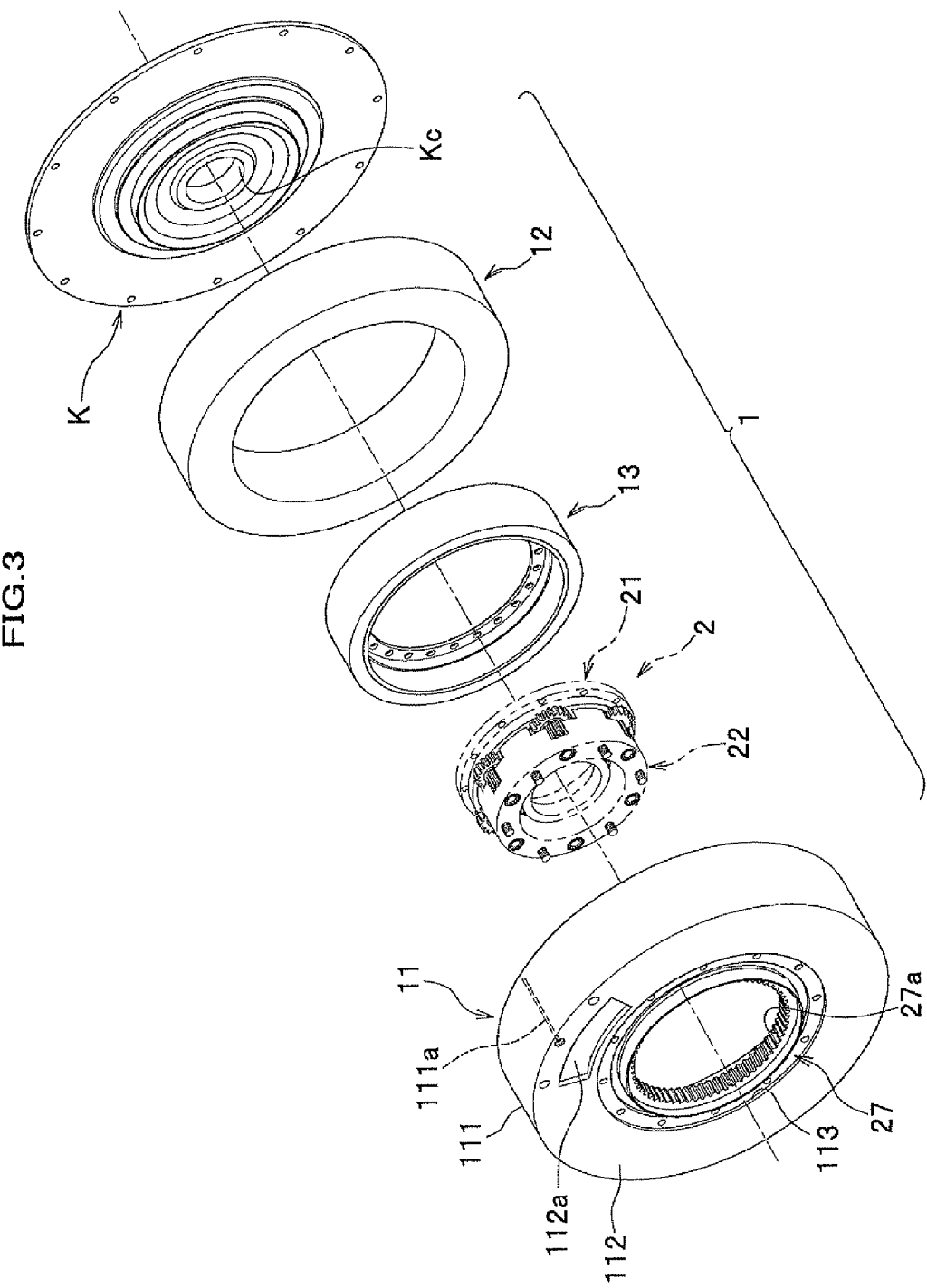
FIG. 3 is an exploded perspective view of the motor.

With reference to FIGS. 2 and 3, the motor 1 includes a motor housing 11, a stator 12 fixed to the inner peripheral surface of the motor housing 11, and a rotor 13 provided diametrically inside the stator 12 so as to face the stator 12.

The motor housing 11 is made of a material which is light-weighed and with high rigidity, such as aluminum-magnesium alloy. The motor housing 11 includes an outer peripheral wall 111 (wall portion) and a bottom wall (wall portion) 112, and an opening 113 is provided at the center of the bottom wall 112. The end portion of the outer peripheral wall 111 is fixed to the left side of the knuckle K so that a space is formed between the knuckle K and the motor housing 11 for positioning the stator 12, the rotor 13, and the reduction gears 2.

Each of the outer peripheral wall 111 and the bottom wall 112 has a predetermined thickness, and a brake fluid passage 111a for brake fluid is formed inside the upper part of the outer peripheral wall 111 extending along the right and left direction. The brake fluid passage 111a is a linear passage extending through the outer peripheral wall 111. As seen in FIG. 2, the right end of the brake fluid passage 111a is connected via a joint J to a fluid pressure generating means such as a master cylinder (not shown) that is provided in the vehicle body, whereas the left end of the brake fluid passage 111a is connected to a brake fluid supply port 31a of the braking mechanism 3 to be described later. Since the brake fluid passage 111a is a linear passage, machining is readily performed to form the brake fluid passage 111a.

As shown in FIGS. 2 and 3, a mount recess 112a is formed in the outer surface of the bottom wall 112. As described later, an inner pad 34 is fitted into the mount recess 112a. See FIG. 1. Further, an inner gear member 27 having inner gears 27a is provided along the inner peripheral surface of the opening 113 formed in the bottom wall 112. The inner gear member 27 is a part of the reduction gears 2 to be described later, and secondary gears 26 (see FIGS. 4 and 5) which form a part of the reduction gears 2 are meshed with the inner gear member 27.

The stator 12 is an annular member that is fixed to the motor housing 11 along the inner peripheral surface of the motor housing 11. The stator 12 is configured such that coils (not shown) are wound around the core.

The rotor 13 is arranged inside the stator 12 with a predetermined space so that the rotor 13 and the stator 12 are faced to each other. The rotor 13 is made of a permanent magnet. The rotor 13 rotates when the stator coil of the stator 12 is electrified. The rotation force of the rotor 13 is transmitted to the reduction gears 2.

Configuration of Reduction Gears

Figure 4:
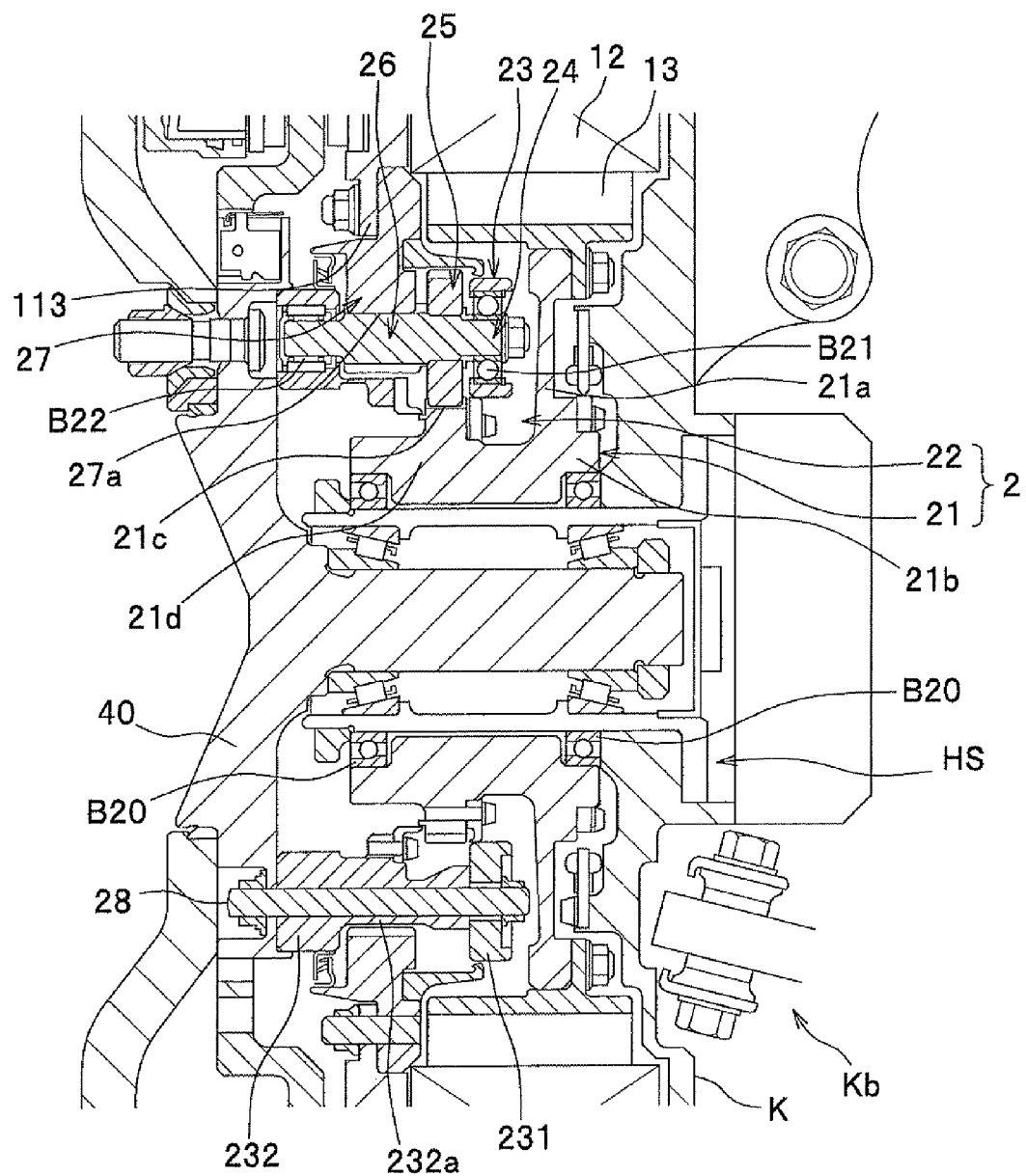
FIG. 4 is an enlarged section showing main parts of the reduction gears.
Figure 5:
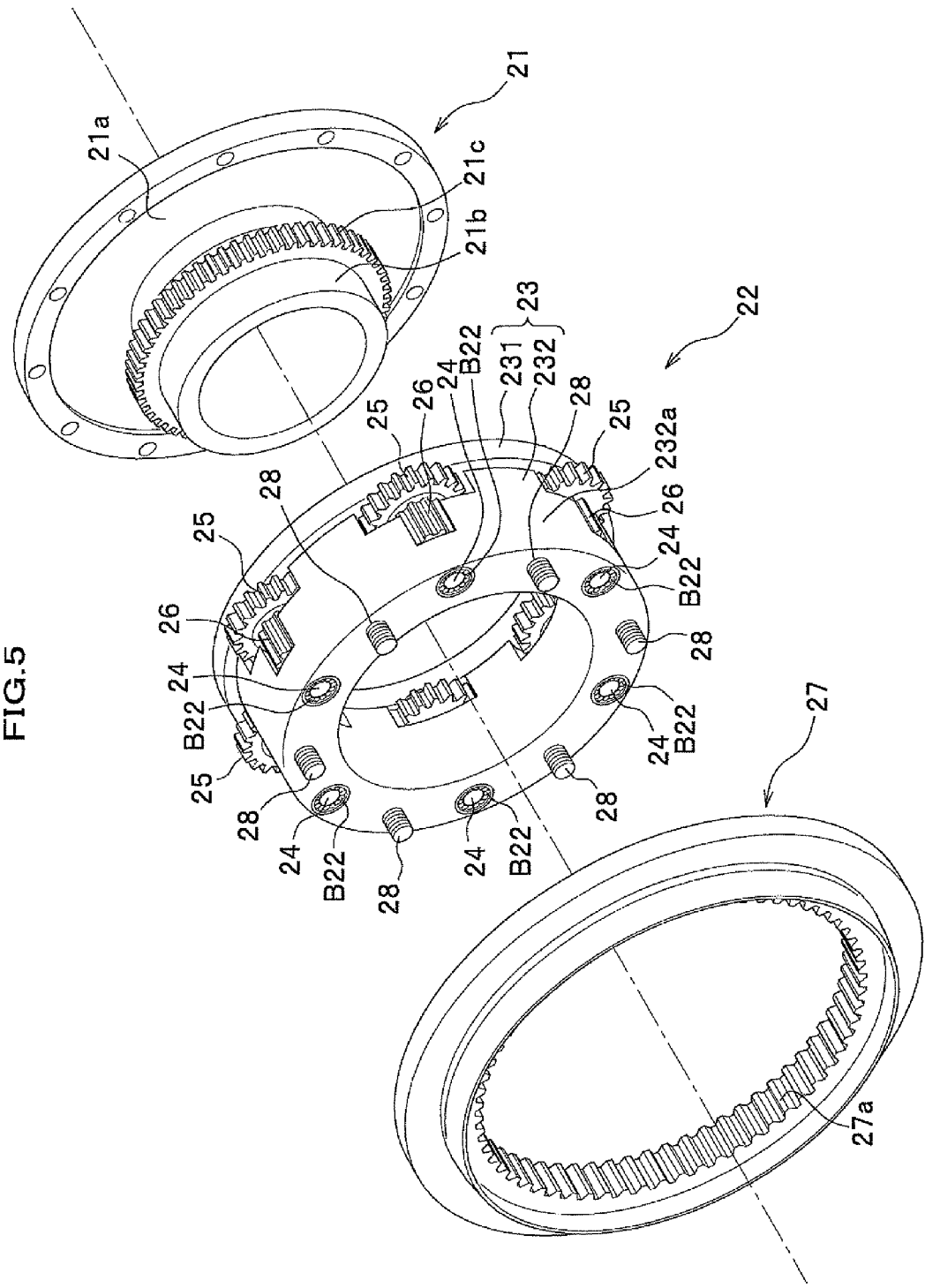
FIG. 5 is am exploded perspective view of the reduction gears.

As seen in FIGS. 4 and 5, the reduction gears 2 consists of a sun gear 21 that is fixed to the rotor 13, and a planetary gear assembly 22 that is rotatably mounted to the sun gear 21.

As shown in FIGS. 4 and 5, the sun gear 21 includes a cylindrical portion 21b with a flange portion 21a. The flange portion 21a is fixed to the rotor 13, and the cylindrical portion 21b is fitted onto the hub holder HS via the bearings B20. Since the sun gear 21 is fixed to the rotor 13, the sun gear 21 rotates with the rotor 13 in a unified manner around the hub holder HS. The cylindrical portion 21b is provided with external gears 21c at positions near the left end of the cylindrical portion 21b. As described later, first gears 25 of the planetary gear assembly 22 are meshed with the external gears 21c, so that the rotation of the sun gear 21 allows the planetary gear assembly 22 to be rotatable.

As shown in FIG. 5, the planetary gear assembly 22 includes a casing 23, six gear shafts 24 rotatably supported in the casing 23, plural sets of first gears 25 and second gears 26 respectively fixed to the gear shafts 24, and the inner gear member 27 provided in the motor housing 11.

The casing 23 consists of an inner casing 231 having an annular shape, and an outer casing 232 integrated with the inner casing 231 via a spacer portion 232a. The casing 23 is fixed to the axle shaft 40 by bolts 28 that extend through the inner casing 231 and the outer casing 232. See the lower part of FIG. 4. The casing 23 supports the gear shafts 24 in a direction parallel to the axis of the axle shaft 40 with gears of the first and second gears 25, 26 partly exposed.

Each gear shaft 24 is attached to the casing 23 with both ends thereof rotatably supported by the bearings B21, B22. The first gear 25 and the second gear 26 are fixed to the gear shaft 24 along the axial direction of the gear shaft 24. The first gear 25 is meshed with the external gears 21c of the sun gear 21 at the inner peripheral side of the casing 23. The second gear 26 is meshed with the inner gears 27a of the inner gear member 27 at the outer peripheral side of the casing 23.

Figure 6:
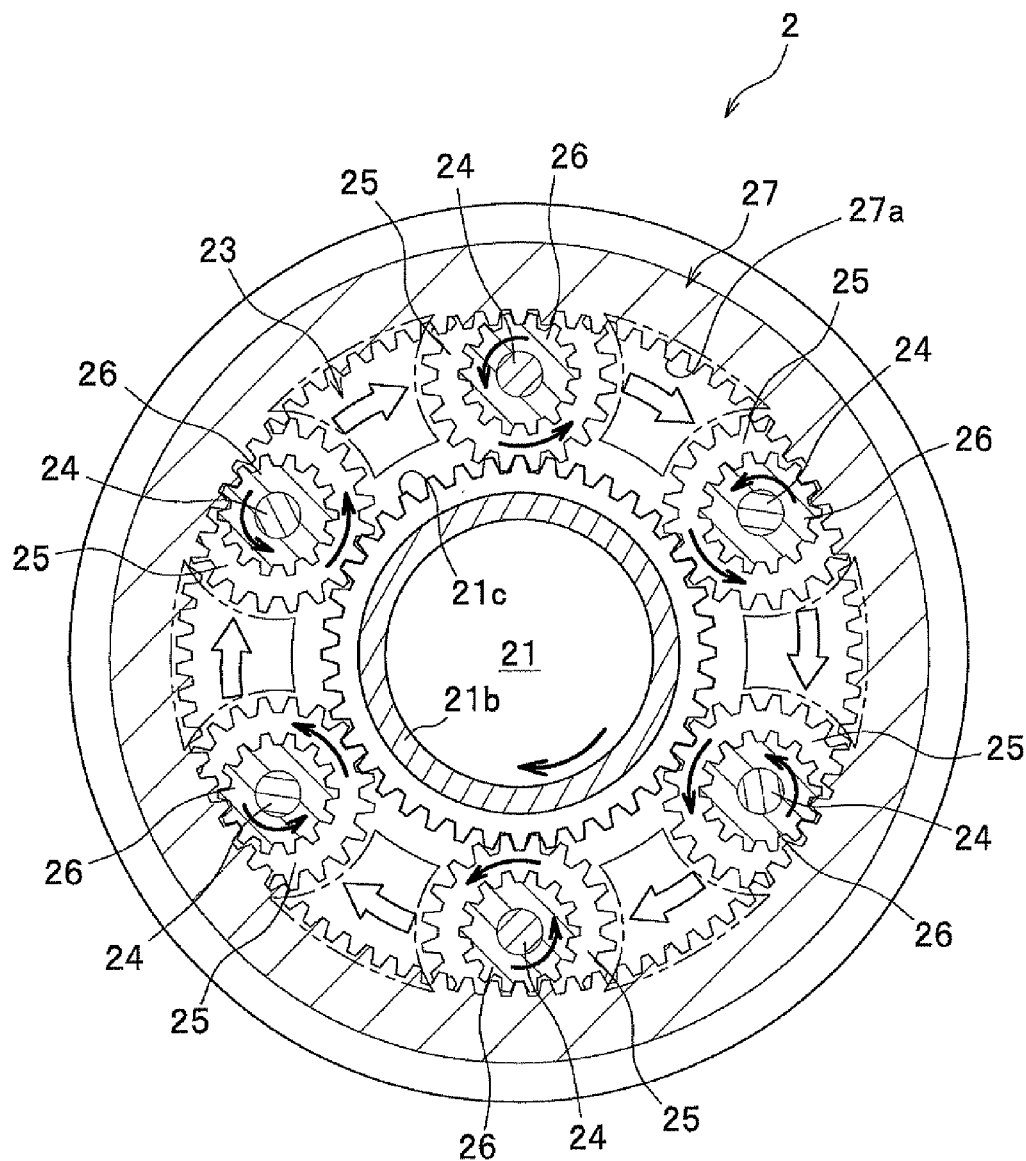
FIG. 6 is a side view illustrating operation of the reduction gears.

As seen in FIG. 6, according to the reduction gears 2 as constructed above, when the sun gear 21 rotates by the rotation of the rotor 13, the external gears 21c of the sun gear 21 and the first gears 25 fixed to the corresponding gear shafts 24 are meshed and rotate the gear shafts 24. In other words, each first gear 25 functions to rotate the gear shaft 24 to which the first gear 25 is fixed, by the rotation of the sun gear 21. Accordingly, when the gear shafts 24 rotate, the second gears 26 fixed to the gear shafts 24 and the inner gears 27a of the inner gear member 27 are meshed to rotate the gear shafts 24 along the inner peripheral surface of the inner gear member 27. In other words, each second gear 26 functions to revolve the gear shaft 24 to which the second gear 26 is fixed around the axis of the sun gear 21. Therefore, when the sun gear 21 rotates, the casing 23 by which the gear shafts 24 are rotatably supported is rotated, and thus the wheel W (see FIG. 2) fixed to the axle shaft 40 that is fixed to the casing 23 can be rotated.

The rotation speed of the gear shaft 24 is determined by the ratio of the number of gears of the sun gear 21 to that of the first gear 25, and the revolution speed of the gear shaft 24 is determined by the ratio of the number of gears of the second gear 26 to that of the inner gear member 27. As with the case of this preferred embodiment, it is possible to increase the reduction gear ratio if the first gear 25 has larger number of gears than the second gear 26.

Configuration of Braking Mechanism 3

Figure 7:
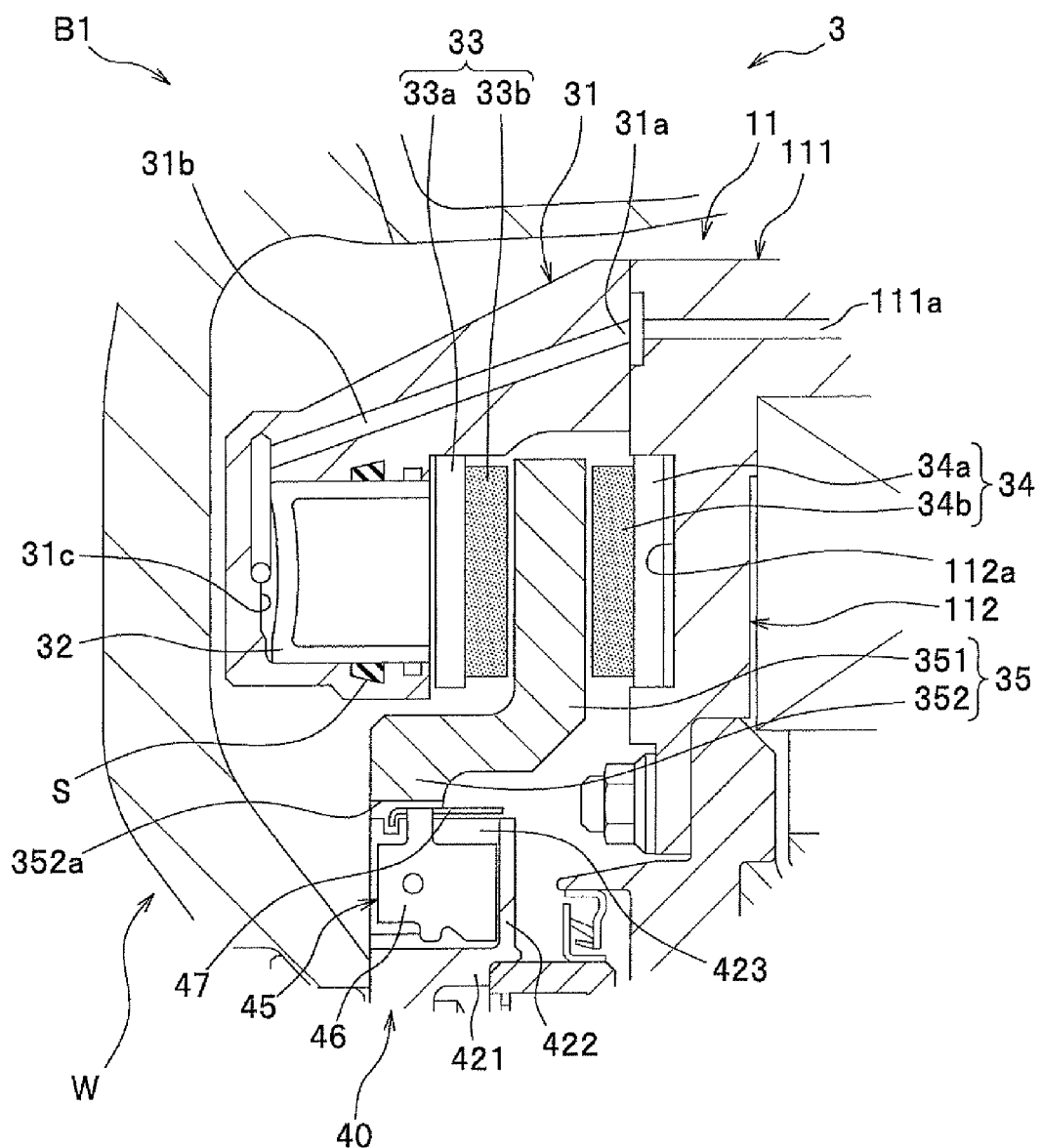
FIG. 7 is an enlarged section showing main parts of the braking mechanism.

As seen in FIG. 7, the braking mechanism 3 includes a disk rotor 35 which rotates with the wheel W through the axle shaft 40, a caliper half (housing) 31 attached to the motor housing 11, a piston 32 (pressing force generating unit) received in the caliper half 31, and an outer pad 33 and an inner pad 34 positioned opposite to each other with the disk rotor 35 interposed therebetween.

The caliper half 31 is attached to an upper left surface of the motor housing 11. More specifically, the caliper half 31 is attached to the motor housing 11 such as to be non-contacting with the outer periphery of the disk rotor 35 to be described later, and further has a cylinder 31c at a position facing to the disk rotor 35. The caliper half 31 is provided at its attachment portion to the motor housing 11 with a brake fluid supply port 31a, to which a brake fluid passage 111a is connected. The brake fluid supply port 31a communicates with the cylinder 31c via a brake fluid passage 31b. Therefore, brake fluid is fed from the brake fluid passage 111a into the cylinder 31c. The caliper half 31 is a member having a half size of the conventional caliper, so that using the conventional parts makes it possible to reduce the cost.

The piston 32 has the shape of a hollow cylinder with a bottom, and is received in the cylinder 31c. Further, a ring-shaped seal member S is provided between the outer periphery of the piston 32 and the cylinder 31. The inner periphery of the seal member S closely contacts with the piston 32 so as to prevent brake fluid from leaking out from a gap between the cylinder 31c and the piston 32.

The piston 32 reciprocates in the axial direction of the disk rotor 35 by the transmission of brake fluid pressure, so that the outer pad 33 is urged to and pressed against the disk rotor 35. During this movement of the piston 32, part of the seal member S that is closely in contact with the piston 32 follows the movement of the piston 32 while deforming. For this reason, when the brake fluid pressure is released, the seal member S returns to the original position by the resilient action of rubber, during which the piston 32 is retuned to the original position by the negative pressure of the brake fluid pressure and the resilient action of the rubber. By this configuration, it is possible to maintain the distance between the disk rotor 35 and the outer pad 33 to a constant value.

The outer pad 33 consists of an outer back plate 33a and an outer frictional member (frictional member) 33b. The outer pad 33 is fitted into the caliper half 31 via a retainer (not shown). When the piston 32 moves to urge the outer pad 33 toward the disk rotor 35, the outer frictional member 33b is pressed against the disk rotor 35.

The inner pad 34 consists of an inner back plate 34a and an inner frictional member (frictional member) 34b. The inner pad 34 is fitted into the mount recess 112a formed in the left surface of the motor housing 11 via a retainer (not shown).

The disk rotor 35 is a floating disk which rotates with the wheel W in a unified manner and is movable in the direction of the rotation axis of the disk rotor 35. The disk rotor 35 moves in the axial direction when it is pressed by the outer pad 33, and therefore contacts with the inner pad 34. When the outer pad 33 and the inner pad 34 are pressed against the disk rotor 35 that is rotating so as to provide a sliding contact therebetween, frictional force is generated at the contact surface between the slide-contact surface of the disk rotor 35 and the outer pad 33 as well as at the contact surface between the slide-contact surface of the disk rotor 35 and the inner pad 34, so as to brake the rotation of the disk rotor 35. The disk rotor 35 is attached to the wheel W only by interposing spring plates (resilient members) 45 engageable with the axle shaft 40. Engagement between the disk rotor 35 and the axle shaft 40 will be described below.

As shown in FIG. 9, the disk rotor 35 is an annular-shaped flattened member having an outer peripheral portion 351 to provide the slide-contact surface and an inner peripheral portion 352 as an engagement portion with the axle shaft 40.

As seen in FIG. 7, the outer peripheral portion 351 and the inner peripheral portion 352 are arranged in the axial direction of the disk rotor 35 via a stepped portion extending therebetween. Further, as shown in FIG. 9, six engagement recesses 352a are provided at equal space intervals along the inner peripheral surface of the inner peripheral portion 352.

The axle shaft 40 includes a shaft portion 41 that is rotatably supported in the hub holder HS (see FIG. 2) via the bearings B40, B40, and a disk-shaped fastening member 42 that is fixed to the wheel W by bolts 43 and nuts 44 (see FIGS. 1 and 2).

The fastening member 42 has a center portion 421, a flange portion 422 extending radially from the center portion 421, and six engagement projections 423 projecting from the flange portion 422 along the periphery of the flange portion 422. As shown in FIG. 7, the center portion 421 has a larger thickness than the inner peripheral portion 352 of the disk rotor 35. The disk rotor 35 is movable in the axial direction by the distance corresponding to the difference between the thicknesses of the center portion 421 and the inner peripheral portion 352. The engagement projections 423 are provided at positions corresponding to the respective engagement recesses 352a of the disk rotor 35. The spring plate 45 is attached to each engagement projection 423 so that each of the engagement projections 423 is engaged with the corresponding engagement recess 352a of the disk rotor 35 with the spring plate 45 interposed therebetween.

Figure 10A:
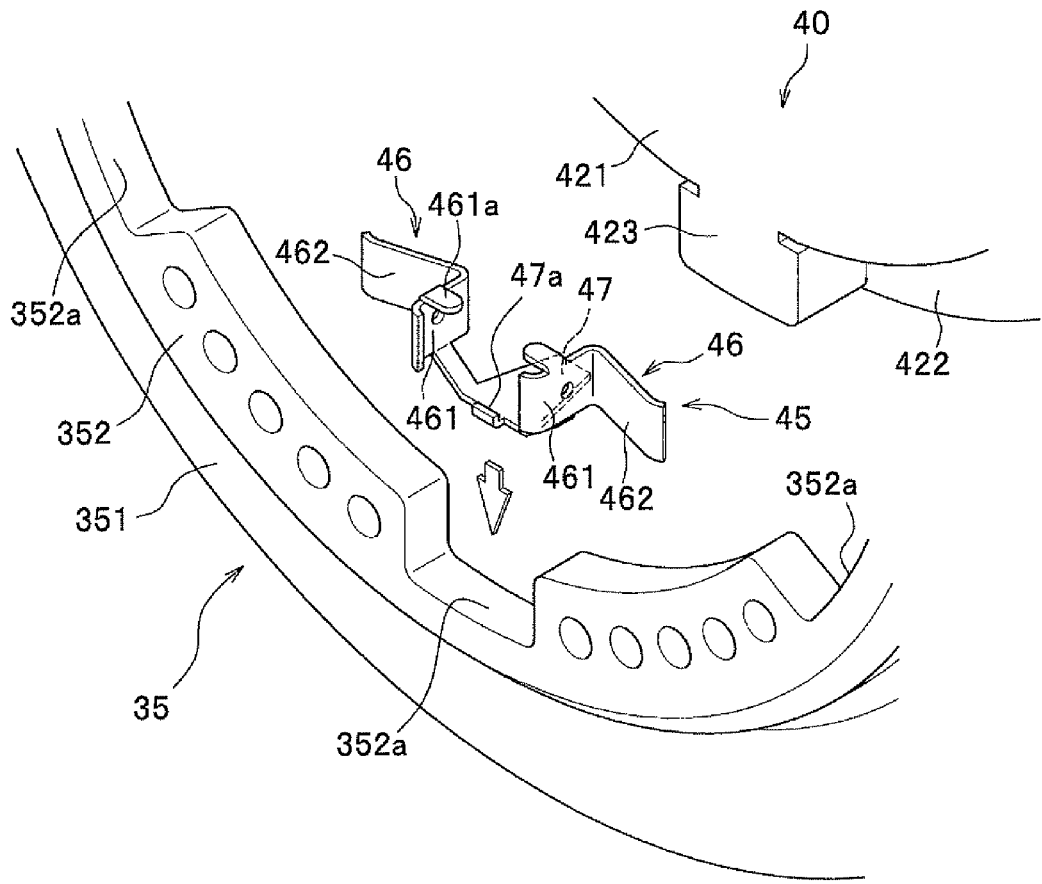
FIG. 10A is an exploded perspective view showing the disk rotor and a spring plate.

As shown in FIG. 10A, the spring plate 45 consists of a pair of spring plate strips 46, 46, and a joint portion 47 joining these spring plate strips 46, 46.

Figure 10B:
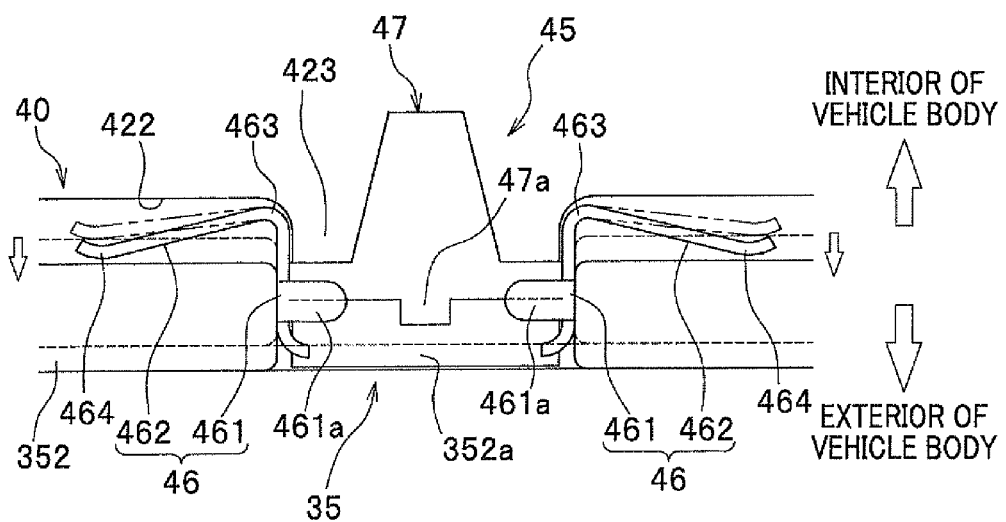
FIG. 10B is a plan view illustrating an engagement between the disk rotor and the axle shaft via the spring plate.

Each spring plate strip 46 includes a first strip 461 that is joined to the joint portion 47, and a second strip 462 that is formed by bending the first strip 461 at an acute angle as seen from top to provide an L-shaped strip (see FIG. 10B).

The spring plate 45 is configured such that the first strips 461, 461 and the joint portion 47 hold the engagement projection 423 of the axle shaft 40 from three different directions, and by stopper strips 461a, 461a extending from the first strips 461, 461 and by a stopper strip 47a extending from the joint portion 47, the spring plate 45 is engaged with the engagement projection 423.

As shown in FIG. 10B, each of the second strips 462, 462 is positioned between the disk rotor 35 and the axle shaft 40. In the spring plate strip 46, a bent point formed between the first strip 461 and the second strip 462 functions as a supporting point 463, whereas a bent point formed at the distal end portion of the second strip 462 functions as a point of action 464. The supporting points 463, 463 contact with the flange portion 422 of the axle shaft 40.

As shown by broken lines in FIG. 10B, when the disk rotor 35 displaces inward of the vehicle body along the rotation axis, the second strips 462, 462 of the spring plate 45 are pressed by the disk rotor 35 and deformed toward the axle shaft 40. When the pressing force of the disk rotor 35 is released, the second strips 462, 462 spring back by the resilient action thereof around the supporting points 463, 463 so that the disk rotor 35 is pushed back toward the exterior of the vehicle body by means of the points of action 464, 464. This can create a push-back structure for the disk rotor 35, which can prevent interference between the disk rotor 35 and the motor housing 11, even if the inner frictional member 34b of the inner pad 34 is worn out and thickness of the pad becomes thinner as illustrated in FIG. 8 so that the distance between the disk rotor 35 and the motor housing 11 is too narrow (e.g., the position surrounded by a circle C).

Operation of Brake Structure B1

Figure 8:
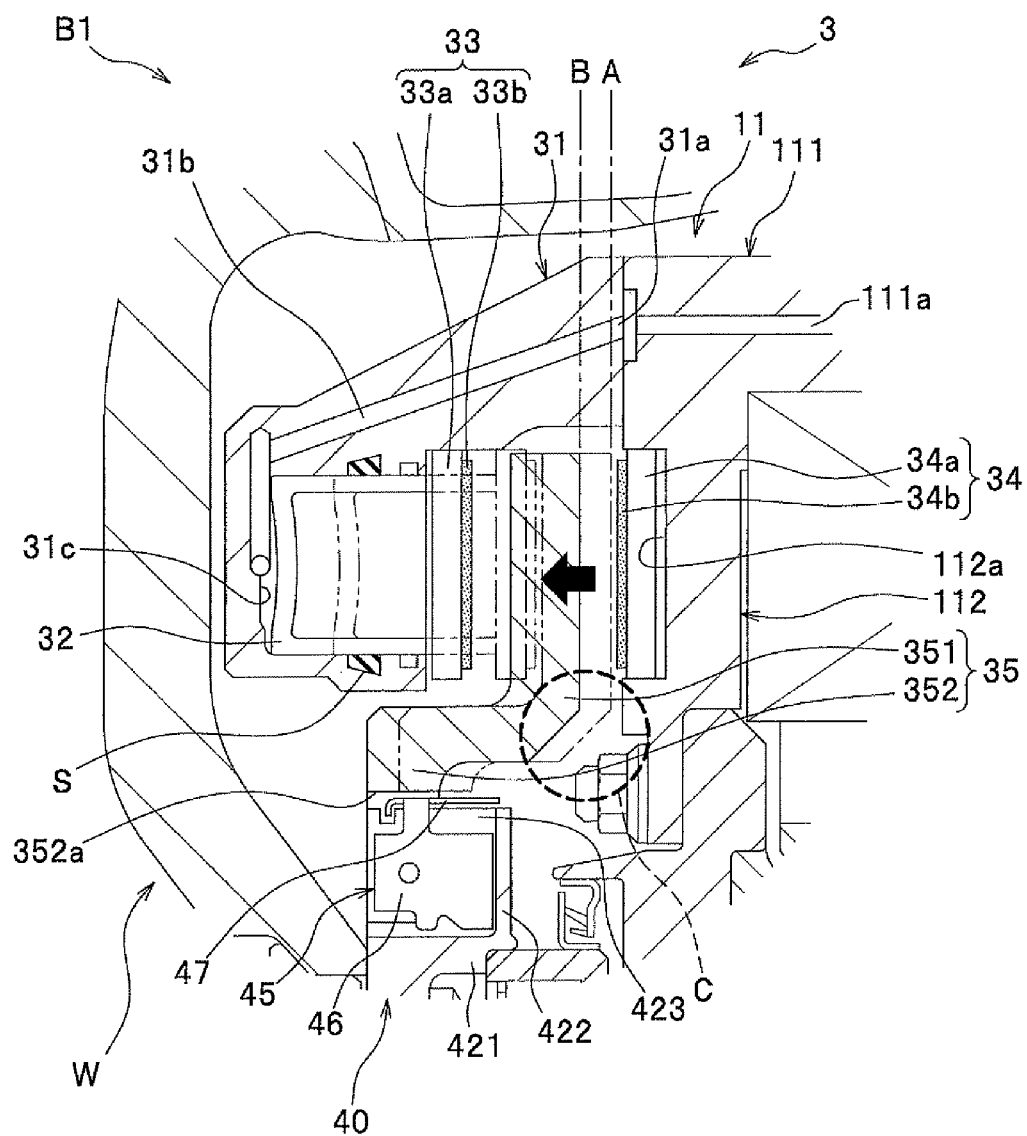
FIG. 8 is an enlarged section showing main parts of the braking mechanism when the pads are worn out.

With reference to FIGS. 7 and 8, the operation of the brake structure B1 according to this embodiment will be described. When the vehicle runs, the disk rotor 35 shown in FIG. 7 rotates together with the wheel W. In order to brake the vehicle, brake fluid is supplied from a brake fluid pressure generating unit such as a master cylinder (not shown) provided in the vehicle body to the brake structure B1 according to this embodiment.

Brake fluid is supplied through the brake fluid passage 111a of the motor housing 11, the brake fluid supply port 31a of the caliper half 31, and the brake fluid passage 31b and into the cylinder 31c, thereby transmitting brake fluid pressure to the piston 32. Therefore, the piston 32 advances toward the inside of the vehicle body to press the outer pad 33 against the disk rotor 35. At the same time, the disk rotor 35 is displaced toward the inside of the vehicle body along the axial direction and pressed against the inner pad 34. As a result, the disk rotor 35 makes sliding contacts between the outer pad 33 and the inner pad 34, so that frictional forces generate between the slide-contact surfaces of the disk rotor 35 and each of the contact surfaces of the outer pad 33 and the inner pad 34, thereby braking the rotation of the disk rotor 35.

When the brake fluid pressure is released and the brake structure B1 is in the non-braking state, the piston 32 returns to the original position by the restoring force of the seal member S so that the gap between the outer pad 33 and the disk rotor 35 becomes large. Meanwhile, the gap between the disk rotor 35 and the inner pad 34 is kept because the disk rotor 35 is a floating disk capable of moving in the direction toward the exterior of the vehicle body when the re-rotating disk rotor 35 interferes with the inner pad 34. The disk moves slightly to an extent that would ensure a gap with respect to the pads, for example, for approximately 0.1 to 0.2 mm.

As shown in FIG. 8, if the thicknesses of the outer pad 33 and the inner pad 34 becomes thinner during the course of the actual use, the spring plate 45 pushes back the disk rotor 35 toward exterior of the vehicle body so as not to cause interference between the disk rotor 35 and the motor housing 11, for example, at the position surrounded by the circle C.

The brake structure B1 as constructed above has the following advantages.

(1) Since the brake fluid passage 111a is formed inside the outer peripheral wall 111 of the motor housing 11 so that an externally attached hydraulic pressure tube such as a conventional brake hose is not required, there is no need to ensure space for mounting the externally attached parts, which results in a possibility that the diameter of the motor 1 can be increased to improve the motor torque.

(2) Since an externally attached hydraulic pressure tube such as a conventional brake hose is not required, it is not necessary to consider the layout of the brake hose, and the number of constituent parts can be decreased. Further, since the brake fluid passage 111a is a linear passage, it is possible to form the brake fluid passage 111a in a simple manner, thereby reducing the cost.

(3) Since the inner pad 34 is fixed to the motor housing 11, the thickness of the caliper half 31 can be reduced accordingly. This makes it possible to reduce the size of the braking mechanism 3 along the rotation axis of the disk rotor 35.

(4) Since the disk rotor 35 is a floating disk which is movable in the rotation axis direction of the disk rotor 35, it is possible to apply a braking force equally to the opposite outer and inner pads 33, 34 as well as to reduce dragging of the outer and inner pads 33, 34 against the disk rotor 35 while the brake is not being applied. Further, the movement of the disk rotor 35 in the rotation axis direction allows the frictional surfaces of the disk rotor 35 to be ensured without deformation of the disk rotor 35, thereby reducing a deviation of friction.

Although the brake structure B1 according to one preferred embodiment of the present invention has been described in detail, the present invention is not limited to this specific embodiment and various changes and modifications may be made without departing from the scope of the present invention.

Figure 11:
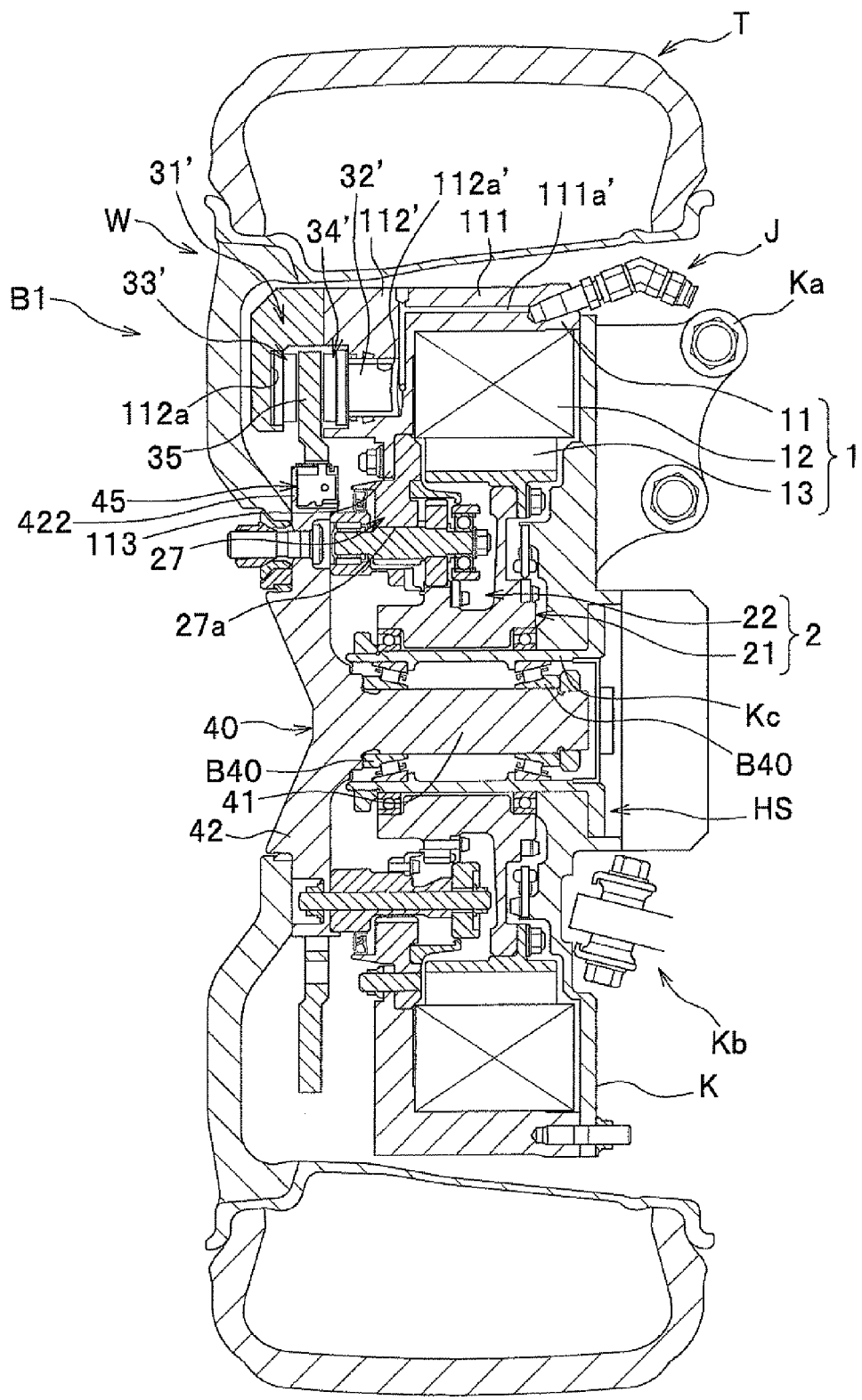
FIG. 11 is a vertical section showing the overall configuration of a brake structure for the wheel rotating device according a modified embodiment as viewed from the rear side of the vehicle body.

For example, the position of the piston is not limited. As shown in FIG. 11, unlike the above embodiment in which the piston 32 is provided outward of the disk rotor 35 toward the exterior of the vehicle body, the piston may be provided inward of the disk rotor 35 toward the interior of the vehicle body.

To be more specific, in the brake structure according to this modified embodiment, a cylinder 112a' for receiving a piston 32' is provided in the bottom wall 112' of the motor housing 11, and a brake fluid passage 111a' communicating with the cylinder 112a' is formed in the bottom wall 112' and the outer peripheral wall 111. A fixing member 31' to which an outer pad 33' has been attached is further attached to the bottom wall 112' of the motor housing 11 such as to be non-contacting with the outer periphery of the disk rotor 35. The disk rotor 35 moves toward the exterior of the vehicle body when it is pressed by the inner pad 34' that is fixed to the piston 32' via a retainer (not shown). The disk rotor 35 is braked by pressing the inner pad 34' and the outer pad 33 against the disk rotor 35. The disk rotor 35 is attached to the axle shaft 40 via the spring plates 45 from the interior side of the vehicle body. In other words, according to this modified embodiment, the brake structure is configured such that the spring plates 45 are attached in the reverse direction to those disclosed in the first embodiment (see FIGS. 2 and 11) because the piston 32' for pressing the disk rotor 35 is provided in the reverse side (interior side of the vehicle body) to that of the first embodiment so that the direction in which the spring plates 45 push back the disk rotor 35 is also defined in the reverse direction.

Therefore, it is possible to provide the piston 32' as a pressing force generating unit, the cylinder 112a', and the fixing member 31' positioned in the opposite side of the piston 32' in a simple structure. Further, the disk rotor 35 can be formed in a flat and simple form (flattened plate shape). As a result, the manufacturing cost of these parts can be reduced.

Although the brake fluid passage 111a is formed as a linear passage in the first embodiment, the shape of the brake fluid passage is not limited to this specific shape. For example, the brake fluid passage may be formed as a curved passage or bent passage. Also, the brake fluid passage may include a plurality of straight passages.

Although only one braking mechanism 3 is provided in the first embodiment, there may be provided another braking mechanism 3 in the opposite position along the circumference of the disk rotor 35. This allows the disk rotor 35 to be readily movable parallelly in the axial direction, thereby reducing a deviation of friction of the disk rotor 35.

Further, in the first embodiment, the axle shaft 40 that is rotatably supported within the hub holder HS is employed as a wheel rotating member. However, the wheel rotating member according to the present invention is not limited to this specific structure, and it is possible to employ a spindle shaft onto which a cylindrical hub is rotatably supported.

Second Embodiment

A brake structure for a wheel rotating device according to a second embodiment will be described below. In this preferred embodiment, an explanation will be given on the case in which a brake structure according to the present invention is adapted to a drum brake. The brake structure for the wheel rotating device can be adapted to any of the wheels including front right, front left, rear right, and rear left wheels. In this preferred embodiment, the brake structure will be explained as an example where it is adapted to the front left wheel.

Figure 12:
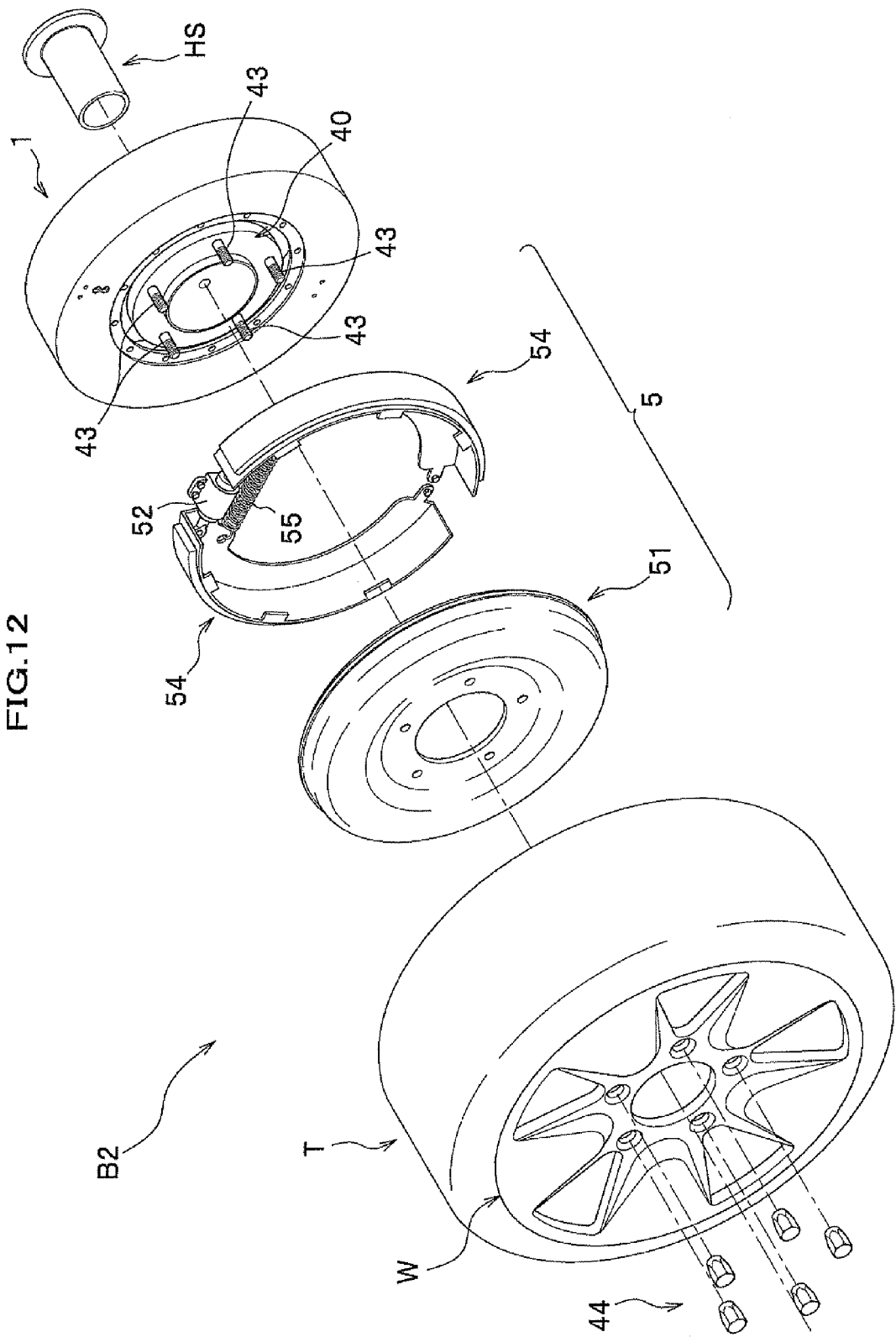
FIG. 12 is an exploded perspective view illustrating the inner structure of a wheel of an in-wheel motor vehicle according to a second embodiment.

As shown in FIG. 12, the brake structure for the wheel rotating device (hereinafter referred to as the brake structure B2) is provided inside the wheel W, to which a tire T is mounted on the rim. The brake structure is equipped with a motor (in-wheel motor) 1 for generating a rotation force for rotating the wheel W, reduction gears 2 (see FIG. 13) for increasing the motor torque while reducing the rotation speed of the motor 1 and then transmitting the rotation force to the wheel W, and a braking mechanism 5 for braking the wheel W.

Figure 13:
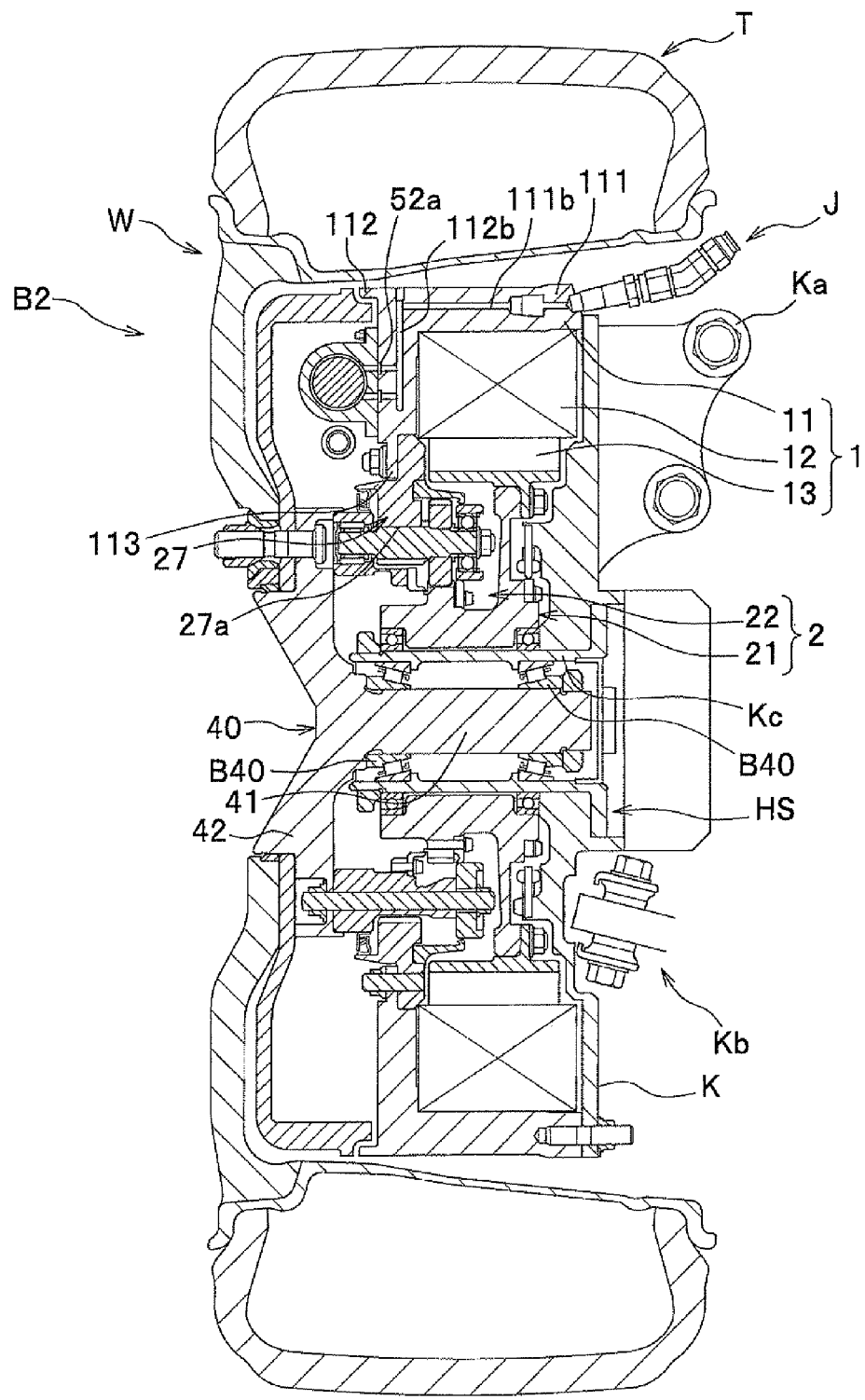
FIG. 13 is a vertical section showing the overall configuration of a brake structure for the wheel rotating device according to the second embodiment as viewed from the rear side of the vehicle body.

In FIG. 13, the right side is directed to the interior of the vehicle body, and the left side is directed to the exterior of the vehicle body.

As seen in FIG. 13, the brake structure B2 according to the second embodiment is basically the same as the brake structure B1 according to the first embodiment as shown in FIG. 2 except for the brake fluid passage 111a provided in the motor housing 11 for the motor 1 and the braking mechanism 3. A description will be given on the motor housing 1 for the motor 1 and the braking mechanism 3.

Configuration of Motor Housing 11 for Motor 1

Likewise the first embodiment, the motor housing 11 includes an outer peripheral wall 111 and a bottom wall 112. The motor housing 11 has the shape of a hollow cylinder with a bottom and the right side thereof opens. The motor housing 11 is fixed to the left side of the knuckle K so that a space is formed between the knuckle K and the motor housing 11 for positioning a stator 12, a rotor 12, and reduction gears 2.

Each of the outer peripheral wall 111 and the bottom wall 112 has a predetermined thickness, and a brake fluid passage 111b for brake fluid is formed inside the upper part of the outer peripheral wall 111 extending in the right and left direction. Further, a brake fluid passage 112b is formed inside the bottom wall 112 extending in the vertical direction.

The brake fluid passage 111b is a linear passage extending from the right end portion of the outer peripheral wall 111 and communicating with the brake fluid passage 112b. The brake fluid passage 112b extends linearly from the intersection point with the brake fluid passage 111b to the position where it faces to the wheel cylinder 52 of the braking mechanism 5, and the distal end of the brake fluid passage 112b is connected to a brake fluid supply port 52a of the braking mechanism 5. Since the brake fluid passages 111b, 112b are formed as a linear passage, machining is readily performed to form the brake fluid passages 111b, 112b. The brake fluid passage 112b is formed by drilling a passage from the upper end portion of the outer peripheral wall 111 with the passage communicating with the brake fluid passage 111b and thereafter by closing the drill-starting point.

Configuration of Braking Mechanism 5

Figure 14:
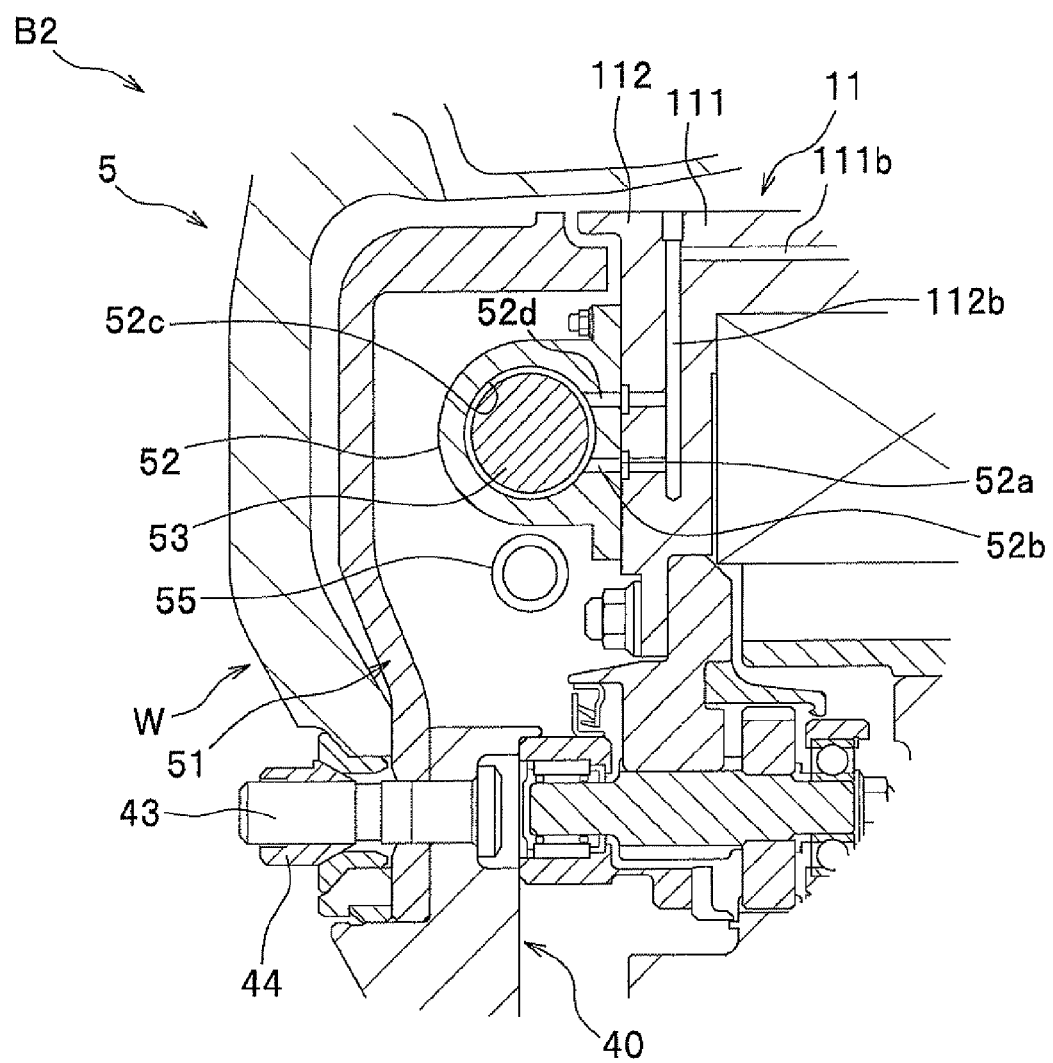
FIG. 14 is an enlarged section showing main parts of the braking mechanism.
Figure 15:
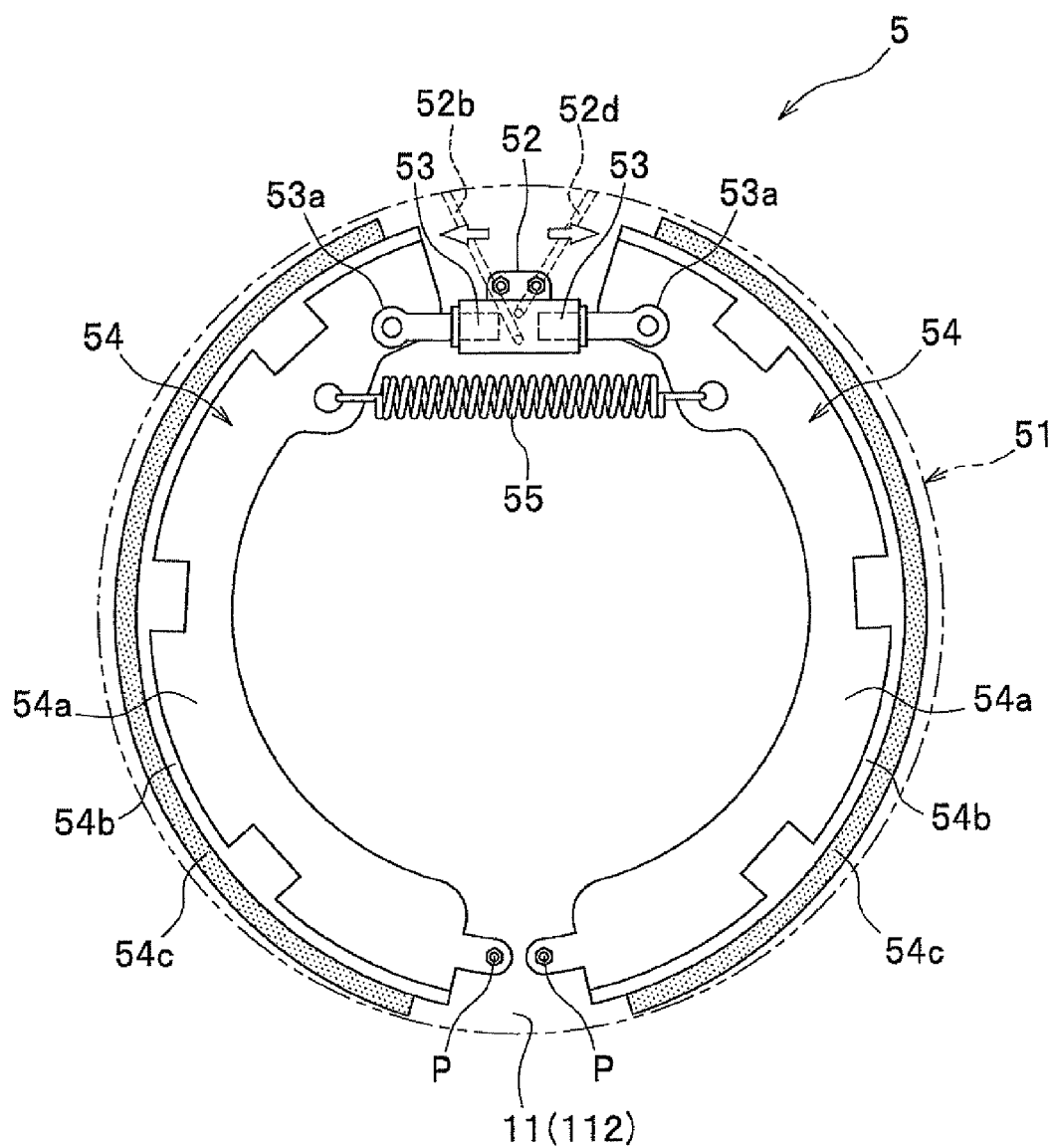
FIG. 15 is a side view illustrating operation of the braking mechanism according to the second embodiment as viewed from the exterior of the vehicle body.

As seen in FIGS. 14 and 15 and when necessary to FIG. 12, the braking mechanism 5 includes a drum rotor 51 which is attached between the wheel W and the axle shaft 40, a wheel cylinder 52 fixed to the motor housing 11, a pair of pistons 53, 53 (only one piston is shown in FIG. 14) received in the wheel cylinder 52, a pair of brake shoes 54, 54, and a spring 55 interposed between the pair of brake shoes 54, 54.

As shown in FIG. 14, the drum rotor 51 is formed in a flattened cylindrical shape (see FIG. 12) and is attached between the wheel W and the axle shaft 40 by bolts 43 and nuts 44. Therefore, the drum rotor 51 rotates together with the wheel W.

The wheel cylinder 52 is attached to an upper left surface of the motor housing 11. The wheel cylinder 52 is provided at its attachment portion to the motor housing 11 with a brake fluid supply port 52a, which communicates with a cylinder cavity 52c inside the cylinder via a brake fluid passage 52b. Therefore, the cylinder cavity 52c is filled with brake fluid supplied from the brake fluid passages 111b, 112b of the motor housing 11. Reference numeral 52d of FIGS. 14 and 15 denotes an air vent for discharging air within the wheel cylinder 52 to provide fluid tight (oil tight).

As seen in FIG. 15, the pistons 53, 53 are provided in pair in a serial manner, and each piston 53 is received in the corresponding cylinder cavity 52c of the wheel cylinder 52. The distal end of each piston 53 is connected to an output member 53a, which is further connected to a brake shoe 54.

The piston 53 advances the output member 53a toward the external side of the wheel cylinder 52 when brake fluid pressure is transmitted to the piston 53.

Each brake shoe 54 has a web 54a in the shape of a semicircular arc, a back plate 54b fixed to the outer peripheral edge of the web 54a, and a lining 54c (frictional member) fixed to the outer peripheral edge of the back plate 54b.

The web 54a is pivotally supported by an anchor pin P at its lower portion. The upper part of the web 54a is connected to the distal end of the corresponding output member 53a as described above. A spring 55 bridges between the pair of webs 54a, 54a so that the webs 54a, 54a are urged radially inward of the motor housing 11.

The back plate 54b and the lining 54c are also formed in the shape of a semicircular arc corresponding to the web 54a. In the normal state where brake is not applied, the outer peripheral surfaces of the pair of linings 54c face to the inner peripheral surface of the drum rotor 51 in a non-contacting manner.

Operation of Brake Structure B2

With reference to FIGS. 14 and 15, the operation of the brake structure B2 according to this embodiment will be described. When the vehicle runs, the drum rotor 51 shown in FIG. 14 rotates together with the wheel W. In order to brake the vehicle, brake fluid is supplied from a brake fluid pressure generating unit such as a master cylinder (not shown) provided in the vehicle body to the brake structure B2 according to this embodiment.

Brake fluid is supplied through the brake fluid passages 111b, 112b of the motor housing 11, the brake fluid supply port 52a of the wheel cylinder 52, and the brake fluid passage 52b and into the cylinder cavities 52c, 52c, thereby transmitting brake fluid pressure to the pistons 53, 53. Therefore, as shown in FIG. 15, the pistons 53, 53 advance the output members 53a, 53a toward the external side of the wheel cylinder 52 to thereby extend the upper end portion of each brake shoe 54 in the outward direction with the anchor pin P functioning as a supporting point. As a result, the outer peripheral surfaces of the linings 54c, 54c are pressed against the inner peripheral surface of the drum rotor 51, so that frictional forces generate between the slide-contact surfaces of the drum rotor 51 and the contact surfaces of the linings 54c, 54c, thereby braking the rotation of the drum rotor 51.

When the brake fluid pressure is released and the brake structure B2 is in the non-braking state, the webs 54a, 54a returns to the original positions by the resilient force of the spring 55 and negative pressure of the brake fluid pressure. Clearance between the drum rotor 51 and each lining 54c is properly kept by an automatic clearance adjusting mechanism (not shown) even if the linings 54*c* are worn out.

The brake structure B2 as constructed above has the following advantages.

(1) Since the brake fluid passages 111*b*, 112*b* are formed inside the outer peripheral wall 111 and the bottom wall 112 of the motor housing 11, respectively so that an externally attached hydraulic pressure tube such as a conventional brake hose is not required, there is no need to ensure space for mounting the externally attached parts, which results in a possibility that the diameter of the motor 1 can be increased to improve the motor torque.

(2) Since an externally attached hydraulic pressure tube such as a conventional brake hose is not required, it is not necessary to consider the layout of the brake hose, and the number of constituent parts can be decreased. Further, since the brake fluid passages 111*b*, 112*b* are a linear passage, it is possible to form the brake fluid passages 111*b*, 112*b* in a simple manner, thereby reducing the cost.

(3) The brake structure B2 employs a drum brake with a self-servo characteristic and ensuring extended area of the pads, and the wheel cylinder 52 and the brake shoes 54, 54 are directly attached to the motor housing 11. This makes it possible to reduce the size of the braking mechanism 5 in the axial direction than the braking mechanism 3 with the caliper half 31 according to the first embodiment.

Although the brake structure B2 according to the second embodiment has been described in detail, the present invention is not limited to this specific embodiment and various changes and modifications may be made without departing from the scope of the present invention.

Although the brake fluid passages 111*b*, 112*b* are formed as a linear passage in the second embodiment, the shape of the brake fluid passage is not limited to this specific shape. For example, the brake fluid passage may be formed as a curved passage or bent passage.

According to the second embodiment, parts (wheel cylinder 52, brake shoes 54, 54) of the braking mechanism 5 are directly attached to the motor housing 11. However, the attachment structure is not limited to this specific embodiment. For example, these parts may be attached to the motor housing 11 via a back plate so as to facilitate attachment of the braking mechanism to the motor housing 11.

What is claimed is:

1. A wheel, comprising:
    a motor provided in a wheel for providing a rotational force to the wheel, the motor having a motor housing;
    a brake fluid passage formed in the motor housing;
    a brake line extending from the motor housing and in fluid communication with the brake fluid passage; and
    a brake applying a braking force to the wheel, the brake comprising:
        a brake housing;
        a pair of frictional members;
        a rotor;
        an actuator moving the friction members from a first disengaged position to a second engaged position; and
        a supply port for supplying brake fluid to the actuator, the supply port extending through the brake housing from the brake fluid passage to the actuator,
    wherein the brake housing contacts the motor housing so that the supply port is in fluid communication with the brake fluid passage.

2. The wheel of claim 1, further comprising:
    a connector, the connector having a first end attached to the brake line and a second end attached to the motor housing.

3. The wheel of claim 1, wherein the rotor comprises a drum, and wherein each of the frictional members has one end pivotally supported and the other end which is attached to the actuator, the actuator engaging the frictional members to reciprocate the frictional members against an inner periphery of the drum.

4. The wheel of claim 3, wherein the actuator includes a cylinder.

5. The wheel of claim 1, wherein the rotor is a disk,
    wherein the frictional members are a first frictional member and a second frictional member positioned opposite to each other with the disk rotor interposed therebetween,
    wherein the first frictional member is fixed to the actuator, and
    wherein the actuator is movable in a direction of a rotation axis of the disk.

6. The wheel of claim 5, wherein the actuator includes a piston.

7. A brake structure for a wheel rotating device, which comprises a motor that is provided in a wheel and driven for rotating the wheel, and a braking mechanism for actuating a brake to brake the wheel,
    wherein the motor comprises:
        a motor housing that is attached to a knuckle, the motor housing being in an annular shape and having a center hole;
        a stator positioned in and fixed to the motor housing; and
        a rotor positioned in the motor housing and facing to the stator,
    wherein the braking mechanism comprises:
        a drum rotor to rotate with the wheel;
        frictional members to be in contact with the drum rotor for the generation of a braking force;
        a pressing force generating unit for generating a pressing force to have the frictional members urged to and pressed against the drum rotor by a fluid pressure transmitted through brake fluid supplied through a brake fluid passage; and
        a second housing for housing the pressing force generating unit;
    wherein the frictional members are a pair of frictional members, and each of the frictional members has one end which is pivotally supported and the other end which is attached to the pressing force generating unit,
    wherein the pressing force generating unit is capable of having each of the frictional members make a reciprocating movement into slidable contact with the inner periphery of the drum rotor, and the second housing contacts the motor housing, and
    wherein the brake fluid passage is formed inside an outer peripheral wall of the motor housing outside a periphery of the knuckle, and is connected to a brake fluid supply port provided in the second housing.

8. The brake structure according to claim 7, wherein the drum rotor is disposed in a space between the motor and the wheel and attached to the wheel.

9. The brake structure according to claim 7, wherein the housing is disposed in a space between the motor and the wheel, and
    wherein each of the frictional members comprises:
        a web being in a shape of a semicircular arc;
        a back plate fixed on an outer periphery of the web and a lining fixed on an outer periphery of the back plate; and the web of the each of the frictional members has one end which is pivotablly supported and disposed in a vicinity of a lowest point of the motor housing in a vertical direction.

* * * * *